H. O. BAKER.
WATER BOILER.
APPLICATION FILED JAN. 3, 1919.

1,409,515.

Patented Mar. 14, 1922.
9 SHEETS—SHEET 2.

WITNESS:
Thos. W. Riley

INVENTOR.
Hartley O. Baker
BY
W. J. Fitz Gerald & Co.
ATTORNEYS.

H. O. BAKER.
WATER BOILER.
APPLICATION FILED JAN. 3, 1919.

1,409,515.

Patented Mar. 14, 1922.
9 SHEETS—SHEET 3.

WITNESS:
Thos W Riley

INVENTOR.
Hartley O. Baker
BY
W. J. Fitz Gerald & Co.
ATTORNEYS.

UNITED STATES PATENT OFFICE.

HARTLEY O. BAKER, OF PUEBLO, COLORADO, ASSIGNOR TO THE BAKER STEAM MOTOR CAR AND MANUFACTURING CO., INC., OF PUEBLO, COLORADO.

WATER BOILER.

1,409,515.  Specification of Letters Patent.  Patented Mar. 14, 1922.

Application filed January 3, 1919. Serial No. 269,432.

*To all whom it may concern:*

Be it known that I, HARTLEY O. BAKER, a citizen of the United States, residing at Pueblo, in the county of Pueblo and State of Colorado, have invented certain new and useful Improvements in Water Boilers; and I do hereby declare the following to be a full, clear, and exact description of the invention, such as will enable others skilled in the art to which it appertains to make and use the same.

The present invention appertains to water boilers or steam generators, and is an improvement over the steam generator disclosed in my copending application filed Dec. 6, 1917, Serial No. 205,813.

The primary object of the invention is the provision of a water boiler or steam generator of the semi-flash type, and so designed as to have, in addition to efficient facilities for flashing the water into steam, novel and efficacious means for the storage of water and steam, so that the boiler has a large capacity for reserve water and steam, to enhance its efficiency and utility.

A further object is the provision of such a boiler having coiled tubing providing water heating, water reserve, steam producing, steam reserve, steam drying out and steam superheating coils arranged in a novel manner to accomplish the heating of the water, production of steam and heating of steam in a most satisfactory and desirable manner, the present boiler being capable of being heated by liquid fuel, coal or other source of heat with the same results, and being capable of use generally on automobiles, tractors, trucks, motor boats, locomotives, and for other portable and stationary purposes.

Another object of the invention is the provision of such a boiler having means whereby the water heating and steam producing coils are constantly supplied with water from a water reserve in the boiler, regardless of the means which controls the delivery of water to the boiler, in order that such coils will not become dry. This not only assures of a constant supply of water in the coils for the production of steam in a constant manner, but also avoids the burning out, coloring, and deterioration of the water heating and steam producing coils, and consequent necessity for replacing same at short intervals, as is the case with the ordinary flash boiler.

Another object is to provide a boiler of the nature indicated wherein the production of steam does not retard or repulse the flow of water, as is the case with ordinary flash boilers, it being well known that water in entering an extremely hot pipe, will flash the water into steam at such a rate, that the steam generated tends to repel the flow of water, resulting in the coil becoming excessively heated, and in its coloring and deterioration, as is of course objectionable. With the present improvements, the production of steam does not impede the flow of water, but aids it, the pressure exerted against the supply of water being equalized so that the water can always flow under different pressures, from the water reserve coil or chamber, to the water heating and steam producing coils.

A still further object of the invention is the provision of novel means for supplying and controlling the flow of water to the boiler, through the medium of a thermostat interposed in the circuit of the water and steam, in order that the water level is maintained at a desired point in the water reserve coil or chamber automatically.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 3:
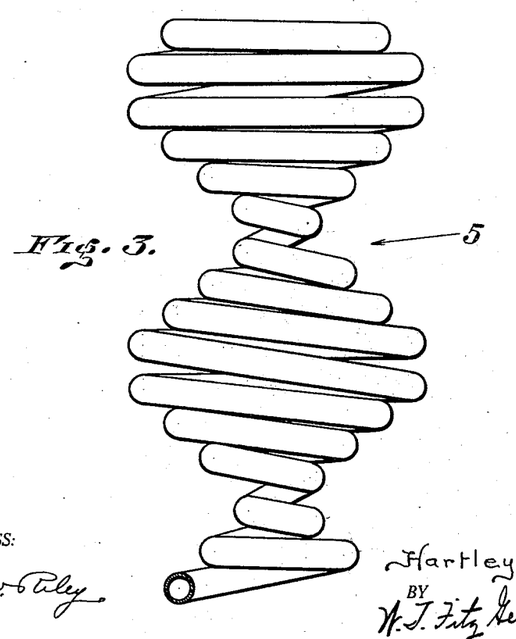
Figure 3 is a scheme or view of the formation of the duplex spiral coils.

The various coils of the boiler resemble, in general appearance, the coils disclosed in said application, although the present invention incorporates a number of improvements and additional features, as will presently appear. The water reserve coils 1 are formed of tubing of relatively large diameter to give these coils large capacity for water held in reserve, and the coils 1 are arranged with their axis vertical, thereby forming an upright wall of cylindrical or other form surrounding the internal core constituting the coils for heating the water and generating the steam. In this way, the water reserve coils provide a casing through which the flames and products of combustion can pass, and said coil will serve as an insulator to confine the heat to the core. Furthermore, the water held in reserve in the coil 1 will receive its initial heat. Disposed concentrically within the water reserve coil 1, and constituting the steam generating core of the boiler, and arranged in superposed relation, from the bottom upward, are the water heating and steam producing coils 2, steam drying coils 3 (also acting as steam superheating coils), water heating coils 4, and steam reserve coils 5. The coils 3, 4 and 5 are of similar formation, and each of them comprises spiral sections arranged in pairs (duplex), as will be better understood by referring to Figure 3, which illustrates a portion of the steam reserve coils 5. The spiral sections are wound upon cones, alternately toward the center and away from the center, and the spiral sections are then pressed together into flat form, so that the smaller convolutions come within the outer convolutions in the same plane. The spiral sections are connected alternately at the center and periphery, thus forming one continuous tubing. The coils 3 and 4 are formed in the same manner as the coils 5, the tubing of the coils 5 is of relatively large diameter to provide a large steam reserve capacity, whereas the tubing of the coils 3 and 4 are of smaller diameter and capacity in order that the water and steam will be heated more effectively than if the same were of tubes of larger diameter.

Each set of coils 3, 4 and 5 can contain any suitable number of spiral sections, and this will naturally depend upon the capacity of the boiler, the heating facilities, and other conditions. As shown, there are four sections in each of the coils 3 and 4, and eight sections in the coil 5, but there may be more or less as conditions may dictate. The tubing of each set of coils 3, 4 and 5, it will be noted, is coiled spirally inward to the center, then extends downwardly to the center of the next lower spiral section, then extends spirally outward, thence downwardly to the periphery of the next lower spiral section, and is then extended spirally inward, being repeated for each pair of duplex spirals. The convolutions of the coils are disposed in staggered relation, whereby convolutions of one coil are disposed above the slots between the convolutions of the coils below, in order that the products of combustion in passing upwardly through the coils must pass in a zig-zag path around the turns of the tubing.

The water supply pipe or tube 6 extends downwardly in the coils 1 and 5 and is connected in the upper end of the coil 4 to deliver the water into the water heating coil 4 which is at an intermediate point, to give the water its initial heat. From the lower end of the coil 4, the tubing extends downwardly as at 7, between the coil 1 and coils 2 and 3, and the lower end of the tubing 7 is connected to a short stand pipe 8 near the lower end thereof, said stand pipe being located within the lower end portion of the coil 1 at one side of the coils 2. The coils 2 are of spiral formation and are superposed in vertically spaced horizontal planes, the outer ends of the coils 2 being connected to the pipe 8, while their inner ends are connected to a central vertical equalizer or circulating tube or stand pipe 9 that extends upwardly within the coils 2, 3, 4, and 5. The water which flows downwardly through the tubing 7 into the pipe 8 can thus flow simultaneously into the outer ends of the coils 2, and the water and steam flows from the inner ends of such coils into the equalizer tube 9. The lowermost coil 2 is preferably formed of tubing of relatively large diameter to increase its capacity and retain sufficient water to prevent this lowermost coil which is nearest the flames, from becoming dry. The other coils 2 are preferably made of tubing of smaller diameter, although these diameters of the tubings can be varied, and various numbers of coils can be used according to the conditions. Although eight of the coils 2 are shown, there may be more or less, according to the capacity of the boiler. A branch 10 connects the lower end of the pipe 8 with the lower end of the water reserve coil 1, so that the water also flows upwardly in the coil 1 from the tubing 7. In this way, water is simultaneously supplied into the water reserve chamber or coil 1 and the water heating and steam producing coils 2.

Figure 4:
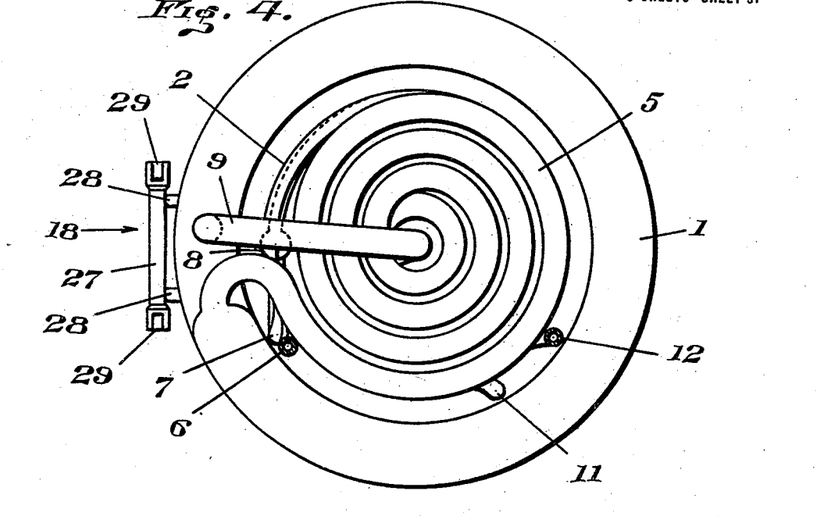
Figure 4 is a plan view of the boiler.

The upper end of the equalizer or circulating tube 9 is connected to the next to the last upper convolution of the coil 1, near the upper end of said coil, as clearly seen in Figure 4, and it will be therefore noted that the water reserve coil 1, and equalizer tube 9 are connected in parallel between the water tubing 7 and upper end of the coil 1 to which the upper end of the steam reserve coil 5 is connected. This arrangement provides for important results as will hereinafter more fully appear, it being noted that the steam passing upwardly in the tube 9 to pass in the upper end of the coil 5, will exert pressure downwardly in the coil 1 against the head or column of water therein, to equalize the pressure against the water from below. The steam in the upper convolution of the coil 1 will naturally rise to the top of this convolution and flow to the coil 5, while any water carried upwardly with the steam into the upper convolution of the coil 1 will gravitate and flow downwardly. In this way, a water trap is provided, in order that any water raised with the steam will drop back into the water reserve. The pressure against the opposite ends of the column of water being equalized, permits the water to flow from the coil 1 into the pipe 8 and coils 2 under all pressures, and the water in the coil 1 being higher than in the coils 2, will cause the water to flow under pressure from the water reserve coil into the water heating and steam producing coils 2. In this manner, although the supply of water to the boiler is shut off by the automatic control, there is sufficient reserve supply of water in the coil 1 to keep the coils 2 supplied with water for the continued production of steam, and to also prevent the coils 2 from becoming extensively heated and burnt out, colored or otherwise deteriorated.

The upper end of the steam reserve coil 5 being connected to the upper end of the coil 1 will receive the steam therefrom, and the coil 5 being of tubing of relatively large diameter will have a large steam capacity, to keep sufficient steam in reserve, so that the supply will be practically constant under varying conditions and loads. From the lower end of the coil 5, the tubing extends downwardly as at 11, and is connected to the upper convolution of the steam drying out and super heating coil 3, and the steam discharge pipe or tube 12 extends upwardly from the lower convolution or end of the coil 3 to the engine or other point of steam delivery. With this arrangement, the steam drying out and super heating coil 3 is located above the water heating and steam producing coils so that the coil 3 is sufficiently removed from the flames, to prevent this coil from being burnt out, as is the case when the steam drying out or super heating coil is too close to the flames, and in view of the fact that the coils which are lowermost are continually supplied with water. This provides an admirable arrangement to avoid the burning out of the tubing or coils as is a constant source of trouble in flash boilers, it being found that the coil 3 need not be so close to the flames with the present improvements.

The water is supplied from a tank 13 or other source of water, by means of a pump 14 which is operated constantly, during the use of the boiler, and which forces the water into and through the pipe 6 under a desired pressure. A pressure check valve 15 disposed in the pipe 6 controls the pressure that must be obtained before the water is delivered into the boiler, say for example, that the valve 15 requires a pressure of six hundred pounds before the water can be forced into the boiler. This valve 15 also prevents the reverse flow, thereby acting both as a pressure valve and as a check valve. Coming to the automatic controller for regulating the delivery of water to the boiler, the same includes a by-pass or shunt 16 connected to the pipe 6 between the pump 14 and valve 15 and leading back to the tank or water source 13. This automatic controller also includes a by-pass valve 17 interposed in the by-pass 16 to control the flow of water therein, in combination with a thermostat 18. This thermostatic control forms the subject matter of another application filed of even date herewith Serial No. 269,433, and is described herein so that the operation may be fully understood.

Figure 1:
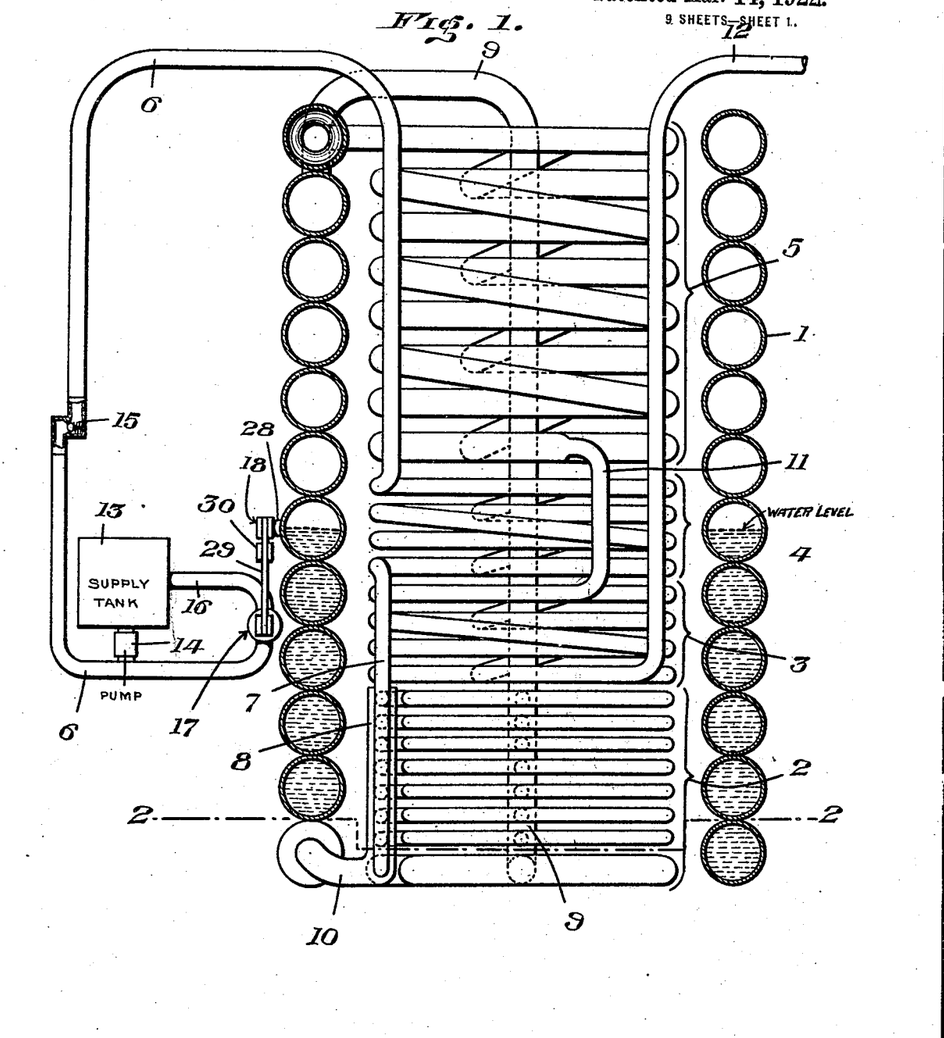
Figure 1 is a side elevation of the improved boiler, the water reserve coils being shown in section, and the water supplying means being illustrated diagrammatically.
Figure 2:
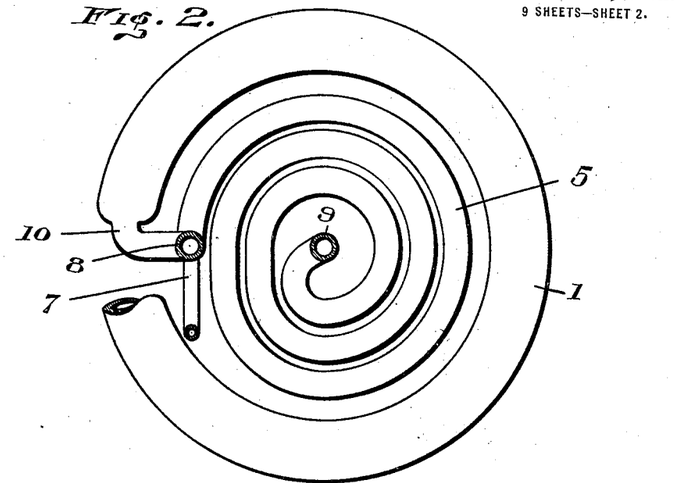
Figure 2 is a section of the line 2—2 of Fig. 1.
Figure 5:
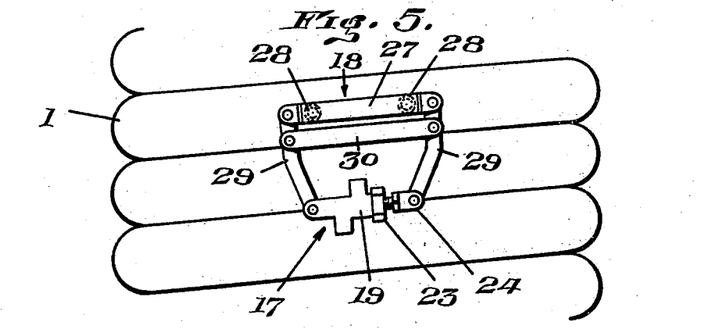
Figure 5 is a fragmentary side elevation of the water reserve coil showing the automatic water controller in place.
Figure 6:
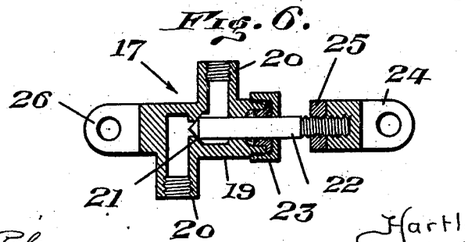
Figure 6 is an enlarged sectional view of the water by-pass valve forming a part of the thermostatic control.

The valve 17 of the thermostatic control comprises a valve casing 19 having the nipples or connections 20 to which the sections of the by-pass pipe 16 are attached, and the casing 19 has a valve seat 21 between said nipples or ports 20 against which the end of a valve stem 22 is seatable to close the passage. One end of the casing 19 has a stuffing box or packing 23 around the valve stem 22 to prevent leakage, and a bifurcated member 24 is threaded or otherwise secured upon the outer end of the stem 22, and is preferably secured in its adjusted position by means of a lock 25 on the valve stem. The nut 25 when loosened permits the valve stem 2 and member 24 to be adjusted relatively, for the purpose of obtaining a regulation of the boiler, as hereinafter set forth. The other end of the casing 19 has a bifurcated portion 26 at that end of the valve opposite to the bifurcated member 24. The thermostat 18 comprises an expansion tube 27 having near its opposite ends nipples or connections 28 that, as shown in Figures 1, 4 and 5, are attached to one convolution of the water reserve coil 1, thus connecting the thermostatic control direct with the coil 1 at one side thereof, so that the water and steam flow through the tube 27. In this position of the tube 27, it will be inclined slightly as seen in Figure 5, due to the helical formation of the coil 1, and in this way one end of the tube 27 is lower than the other, so that the water will drain from said tube as the water level in the coil 1 lowers. As the water and steam flow through the tube 27 it will expand and contract due to increase and decrease in temperature, thus obtaining the control of the valve 17 according to temperature changes in the water and steam.

The operative connection between the thermostat and valve is of compound action, and includes a pair of levers 29 pivoted at one end within the bifurcated member 24 and portion 26, and at the other end in the bifurcated ends of the expansion tubes 27. A link or strut 20 has its ends pivotally connected with the levers 29 at points nearer the expansion tube 27 than the valve 17, so that the pivots of the links 30 provides fulcrums for the levers, with the thermostat connected to the short arms of the levers and the valve connected to and located between the long arms. It will be noted that the valve casing and its seat are connected to one lever, while the valve stem or member is connected to the other lever, so that the expansion of the tube 27 will separate the short arms of the levers, and move the long arms toward one another, thus moving the valve stem 27 and seat 21 together to close the by-pass 16. Conversely, as the tube 27 contracts due to decrease in temperature, the short arms of the levers are pulled toward one another, thereby separating the long arms and pulling the valve casing and stem apart proportionately, so that the by-pass is opened. Due to this arrangement, the supply of water to the boiler is controlled to a nicety, it being noted that the valve 17 can be adjusted accurately to open and close under desired temperature changes.

In operation, assuming that the boiler is being heated and that the coil 1 is filled with water up to a level adjacent to the thermostat, the thermostat will control the valve 17 according to temperature changes, so that when the temperature decreases due to the delivery of water into the boiler, the tube 27 in contracting will open the valve 17 and by-pass 16. As a result, the water pumped by the pump 14 from the tank 15 will pass through the by-pass 16 back into the tank, and this circuit will be continued as long as the valve 17 is open, due to the fact that the water pressure will not be sufficient to force the water past the pressure check valve 15, it being understood that the pump 14 operates continuously during the use of the boiler. However, when the temperature increases and the tube 27 expands, this closes the valve 17 and by-pass 16, and the pressure will accumulate at once and force the water through the supply pipe 6 past the valve 16 into the coils of the boiler. The water first enters the coil 4 to receive its initial heat and then passes downwardly into the pipe 8 and coil 1, the water flowing upwardly from the lower end of the tubing 7 into both the pipe 8 and coil 1, and from the pipe 8 into the coils 2 which heat the water and generate the steam. The steam passes from the coils 2 up through the equalizer tube 9 into the upper portion of the coil 1 which contains steam, and any particles full of water lifted with the steam will drop back in the coil 1 and flow down therein. This provides a water trap, and gives the water an opportunity to flow back to the water reserve, while the steam flows to the upper end of the coil 1 and passes on into the steam reserve coil 5. This coil 5 is of large capacity for holding a sufficient quantity of steam in reserve so that the supply will be constant under varying loads. The steam passes from the lower end of the coil 5 to the coil 3 which is down below the coil 4 and above the coils 2, so that the coil 3 being nearer the flames than the coil 5, will serve to dry the steam out and superheat same, without the coil 3 being too close to the flames.

Particular attention is directed to the fact that the thermostatic control can be regulated accurately, through the adjustment of the valve 17, to control the grade of steam delivered from the boiler. For example, the valve 17 can be so adjusted, that when the water level rises in the coil 1 to a point at which the thermostat is located, the water will flow into the lower end of the tube 27, and contract said tube sufficiently to open the valve 17, thus shutting off the delivery of water to the boiler; and then, when the water level lowers, due to the generation of steam, the water will drain from the tube 27, being forced out by the steam entering the upper end of the tube, and the steam in thus entering the tube 27 will expand same to open the valve 17 and reestablish the flow of water to the boiler. The thermostat will thus operate to maintain the water level in the water reserve coil 1 of a desired height, or at a point at which the thermostat is connected to the coil 1, it being possible to attach the thermostat at different points according to the water level it is desired to maintain in the coil 1. By this adjustment, the flow of water is established when a wet grade of steam enters the expansion tube 27, whereas the flow of water is shut off when the water enters this tube. It is also to be noted that the adjustment of the valve 17 enables the apparatus to be regulated to control the dryness of the steam delivered from the boiler to the engine or other point of steam delivery. Thus, if it is desired that the steam discharged be drier, or more highly superheated, the valve 17 is adjusted, so that changes in steam temperature operates the thermostat to open and close the valve 17. Thus, the presence of steam of low temperature, or a wet grade of steam, in the expansion tube 27 will open the valve 17, whereas the presence of steam of higher temperature will close said valve, so that the valve 17 is opened and closed by changes in temperature of steam above the level of the water in the coil 1, said level, however, being maintained even if below the thermostat. If it is desired to have the steam contain more moisture, and not to be so highly superheated, the valve 17 is adjusted so that it closes when steam of low temperature enters the expansion tube, or it may even require the presence of water in the expansion tube to close the valve 17. The adjustment may also be such that it will require changes in the water temperature to open and close the valve 17. In other words, by adjusting the valve 17 to separate the casing 19 and member 24 further apart with the valve closed, this will decrease the temperature necessary in the expansion tube 27 to close the valve, whereas if the valve is adjusted to bring the member 24 and casing 19 closer together with the valve closed, it will require a higher temperature in the expansion tube to close the valve. In this way, the adjustment of the valve not only controls the water level in the boiler, but also enables the grade or dryness of steam discharged from the boiler to be regulated accurately according to given conditions.

By the provision of the water reserve coil or chamber 1 in combination with the equalizer tube 9 as above described, the coils 2 are constantly supplied with water, regardless of whether water is being supplied into the boiler or not. The steam which passes upwardly through the tube 9 into the upper end of the coil 1 will exert pressure downwardly on the column of water in the coil 1, and this pressure is also exerted against the lower column of water from the coils 2, as will be evident, so that the pressure against the water in the coil 1 from above and below is equalized. The column of water in the water reserve coil 1 being at a higher level than the coils 2, will naturally deliver the water by pressure of gravity from the coil 1 into the coils 2, the water in said coils seeking a common level. Thus, as the water in the coils 2 is generated into steam and there is a tendency for the coils 2 to become dry, this is avoided by the flow of water from the water reserve coil into the coils 2, even if the delivery of water into the boiler is shut off for a time, by the opening of the valve 17. Then when the delivery of water into the boiler is reestablished, this not only supplies water into the coils 2 but also supplies water into the coil 1 so that the water level therein is restored and maintained. The importance of this arrangement will no doubt be apparent from the foregoing, it being kept in mind that with a continuous tubing as ordinarily used in flash boilers, the water in entering the highly heated portion of the tubing, will flash the water into steam, and this serves to repel the entrance of water into the tubing, thus retarding the flow of water, and resulting in the tubing becoming so dry and highly heated that it burns out and becomes colored. This has been the source of considerable trouble in flash boilers, owing to the frequent necessity of removing and replacing the coils. With the provision of the water reserve coil or chamber and the equalizing tube, the bottom coils 2 will always be supplied with water, thus avoiding the burning out or excessive heating of those coils which are nearest the flames. The arrangement and number of coils of the boiler can naturally be changed and altered to suit various conditions and the water reserve chamber and equalizing or circulating tube can vary with different types of boilers within the scope of what is claimed, with the same results and advantages. This boiler, in actual practice, has been found to produce a sufficient volume of superheated steam under all the working conditions and loads, for which the boiler is designed, such as for use on a steam automobile, and it has been found that particles of water are not carried on to the engine, nor do the lower coils of the boiler show any color from heat, indicating that the circulation is perfect. These results obtained in actual practice confirm the theories above discussed, and the boiler has proven to be an extremely fast steam producer. The variation shown in Figure 7 includes the primary water heating coil 31 comprising spiral duplex sections, the water supply pipe 6 leading to the lower end of this coil 31, and a connection 32 leading upwardly from the upper end of said coil, to the lower end of a secondary water heating and steam producing coil 33, which, as shown, has four spiral sections. From the upper end of the coil 33, the connection 34 leads downwardly to a steam producing coil 35, the lower end of which is connected to the lower end of the water reserve coil 1. The equalizer or circulating tube $9^a$ is shown as being connected at its lower end to the upper section of the coil 35, and at its upper end to the next to the last upper convolution of the water reserve coil 1, so that this tube $9a$ conducts the steam upwardly and serves the same function as the tube 9 above described, showing that the coil 35 will be continually supplied with water, either from the pipe 6, or from the water reserve. In this form, the coils 31, 33 and 35 take the place of the coils 4 and 2 above described. A further variation resides in the location of the termostatic controller above the boiler, a pipe 36 leading from the upper end of the coil 1 to the expansion tube 27 of the thermostat 18, from which a pipe 37 leads to the upper end of the steam reserve coil 5. Thus, although the upper ends of the water and steam reserve coils are connected, the thermostat is interposed between them, instead of being attached to the side of the water reserve coil. This location or arrangement of the thermostat may be desirable under certain condition, but the location of the thermostat at the side of the water reserve coil is preferred in most instances. From the lower end of the coil 5, a connection 11 leads downwardly to a steam heating coil 3 or four or other suitable number of spiral duplex sections, and from the lower end of the coil 3, a connection $11^a$ leads downwardly to a steam superheating coil $3^a$ from which the discharge pipe 12 leads. Thus, the steam passes from the steam reserve to the steam drying out coil 3 down closer to the flames, and from the coil 3 passes on down to the superheating coil $3^a$ still closer to the flames, but located above the steam generating coil which is at the bottom.

Figure 7:
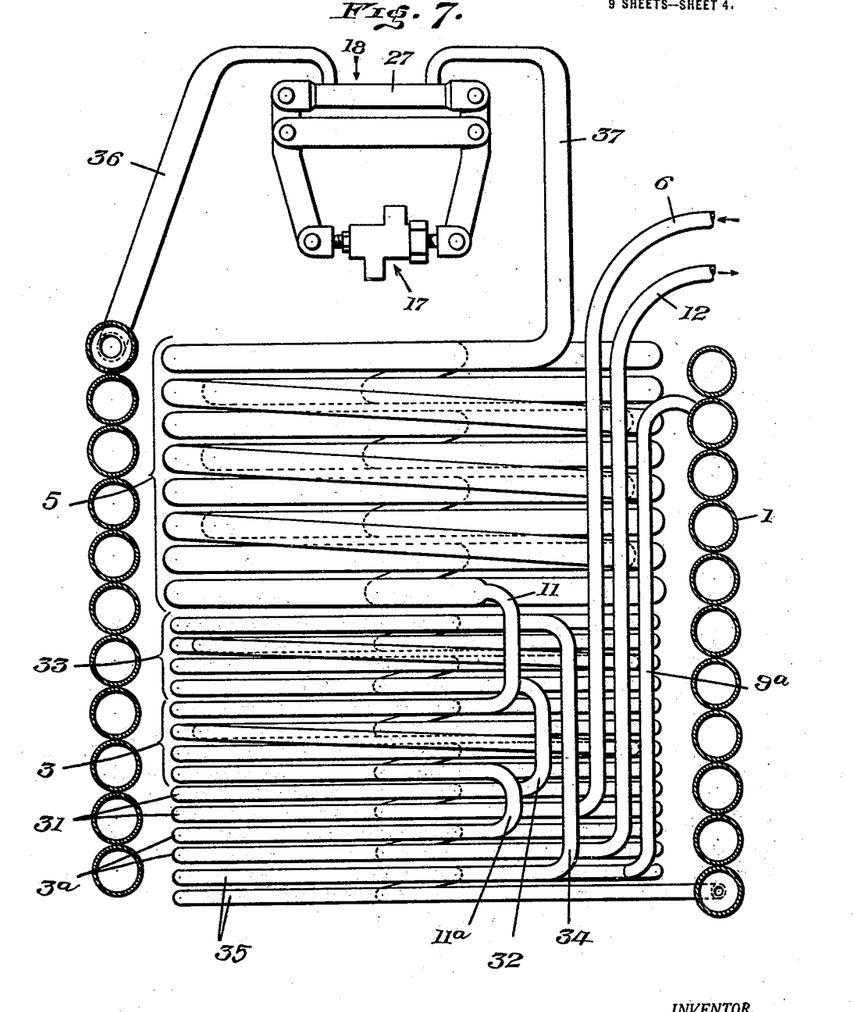
Figures 7, 8 and 9 are views similar to Figure 1 showing different variations in the formation and arrangement of the coils constituting the boiler or generator, and also showing a variation of the automatic control.
Figure 8:
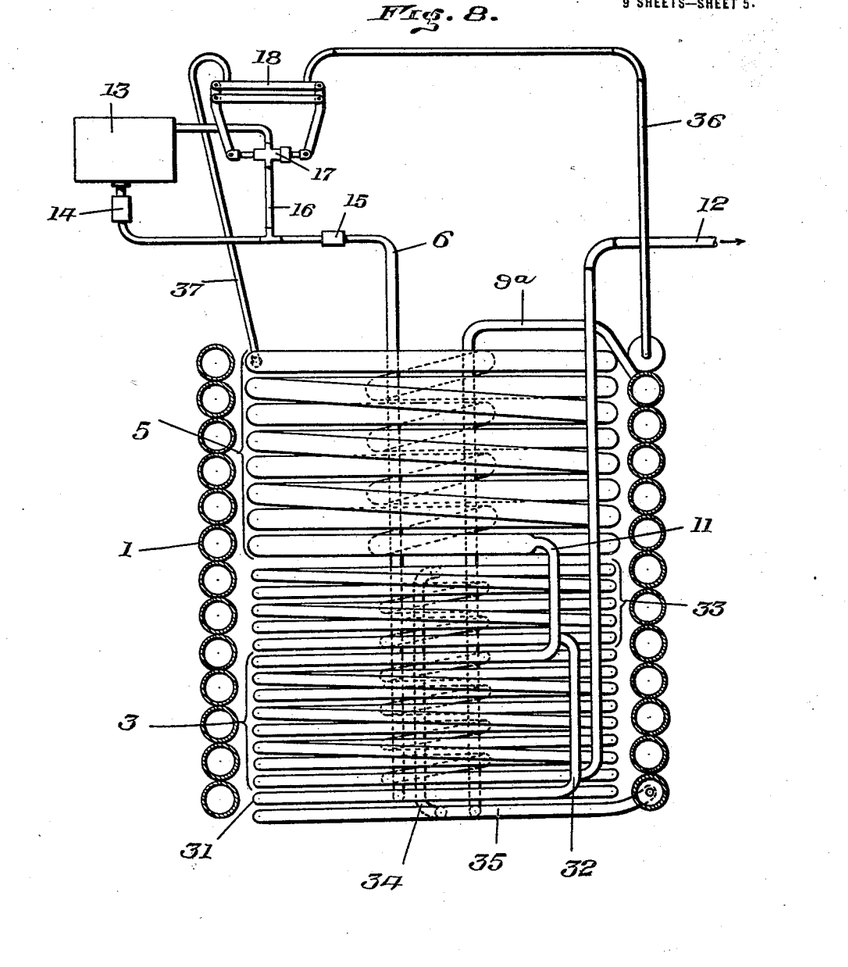

In the modification shown in Figure 8, the arrangement is similar to that in 7, but there are changes in the coils and arrangement thereof. The water supply pipe 6 leads to a water heating coil 31, which is the next to the last coil to the bottom, being of one spiral section as shown. A branch 32 leads upwardly from the coil 31 to the water heating coil 33 above the coil 31 and immediately below the steam reserve coil 5, and from the upper end of the coil 33, a branch 34 extends downwardly within the coils to the steam generating coil 35 at the bottom, comprising a single spiral section as shown. The coil 35 is connected to the lower end of the water reserve coil 1, and the equalizing or circulating tube $9^a$ extends upwardly within the coils from the coil 35 to the upper portion of the coil 1. In this form, the thermostat 18 is disposed between pipes 36 and 37 connected to the upper ends of the respective coils 1 and 5, and a connection 7 leads downwardly from the coil 5 to the steam drying out and super heating coil 3, which, as shown, has eight spiral sections. In this form, the pipe 6, connection 34 and tube $9^a$ are located at the center of the coils, whereas the connections 11, 32 and steam discharge pipe 12 are located at the exterior of the central coils.

Figure 9:
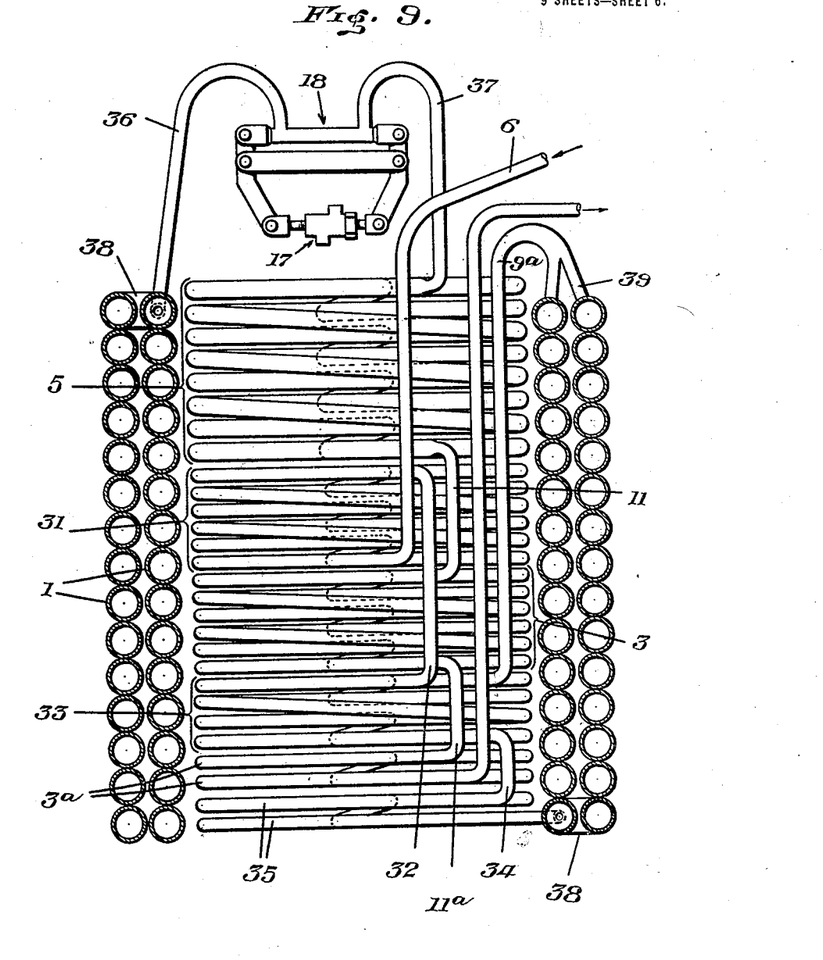
Figure 10:
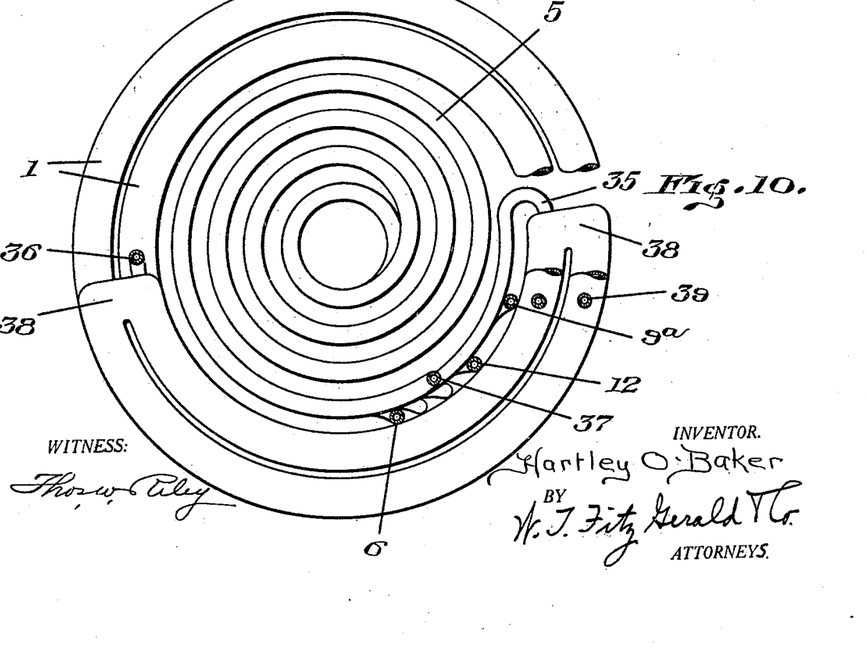
Figure 10 is a plan view of the boiler shown in Figure 9, portions being broken away.

Figure 9 shows how the water reserve coil 1 can be of double formation, consisting of inner and outer concentric helical sections, with the upper and lower ends connected as at 38. In this design of the boiler, the thermostat has been shown as located between the pipes 36 and 37, the same as in Figures 7 and 8, and the water supply pipe leads to the lower end of the water heating coil 31 of six spiral sections. From the upper end of the coil 31, a connection 32 leads downwardly to a water heating and steam producing coil 33 of four spiral sections, and from the lower end of the coil 33, a connection 34 leads downwardly to a water heating and steam producing coil 35 of two sections. This coil 35 is connected to the lower end of the coil 1, and the equalizing tube $9^a$ extends upwardly from the upper convolution or section of the coil 33, and the upper end of the tube $9^a$ is branched, as at 39, and connected to the two sections of coil 1 near the upper end thereof. This tube $9^a$ performs the same function as above described, water being continually supplied to the lower coil 35. A connection 11 leads downwardly from the coil 5 to a steam drying out coil 3 between the coils 31 and 33, and from the lower end of the coil 3, a connection $11^a$ leads downwardly to a steam super heating coil $3^a$ between the coils 33 and 35.

Figure 11:
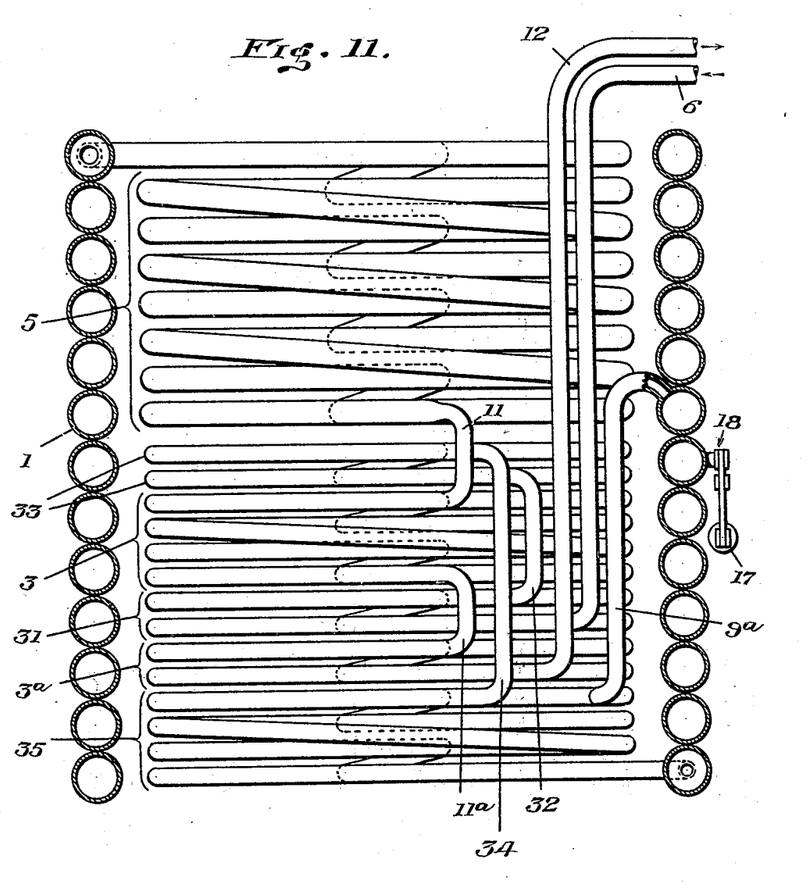
Figures 11 and 12 are views similar to Figure 1 showing further modifications, with the automatic control at the side and attached directly to the water reserve coil.

In Figure 11 the upper ends of the coils 1 and 5 are connected directly with the thermostatic control attached to the coil 1 at the side thereof, the same as in Figure 1. The water supply pipe 6 leads to a water heating coil 31 of two spiral sections, and a connection 32 leads upwardly to a second water heating coil 33 immediately underneath a steam reserve coil 5. A connection 34 leads downwardly from the coil 33 to the water heating and steam generating coil 35 at the bottom which is in turn connected to the lower end of the coil 1 to receive water therefrom independent of the supply through the tube 6. The equalizer tube $9^a$ is connected to the upper convolution of the coil 35 and, in this case, is connected to the coil 1 between its upper and lower ends, or at a point just one convolution above the thermostat, so that the steam is delivered into the coil 1 lower down than in the arrangement shown in the previous figures. The upper part of the coil 1 thus contains a comparatively large quantity of steam, to cooperate with the coil 5 to maintain a large steam reserve, and furthermore, the steam will in this case be delivered to the coil 1 at a point nearer the thermostat when this is desired for modifying the action. A connection 11 leads from the lower end of the coil 5 to the steam drying coil 3 between the coils 31 and 33, and from the coil 3, a connection $11^a$ leads downwardly to the steam superheating coil $3^a$ between the coils 31 and 35.

Figure 12:
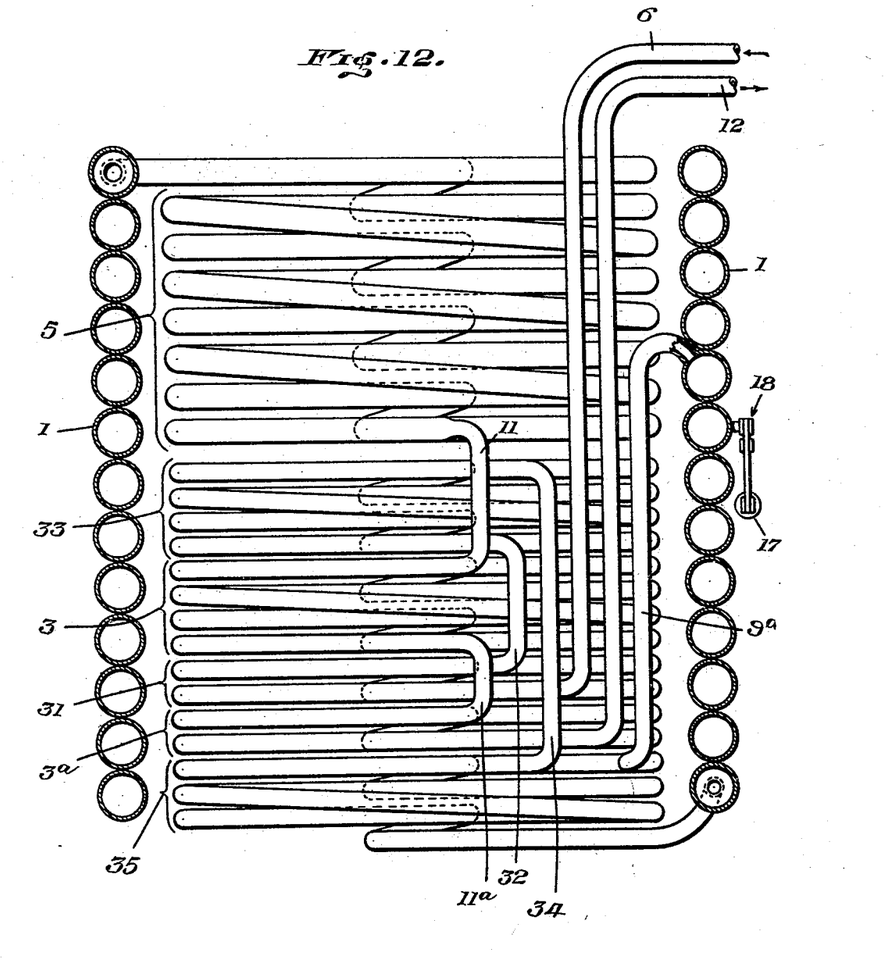

Figure 12 illustrates the arrangement of the thermostat and equalizing tube $9^a$ as in Figure 11, and shows a water heating coil 31 of two spiral sections from which a connection 32 leads upwardly to a second water heating coil 33 higher up or immediately below the coil 5. A connection 34 leads downwardly from the coil 33 to the water heating and steam generating coil 35 at the bottom which is connected to the lower end of the coil 1, the tube 9ᵃ being connected to the coil 35 at the upper portion thereof. This figure shows a steam drying out coil 3 of four spiral sections connected as at 11, to the lower end of the coil 5, and, as at 11ᵃ, to the steam super heating coil 3ᵃ.

It will therefore be noted that Figures 1, 7, 8, 9, 11 and 12 depict various forms of the formation and arrangement of the coils, with the provision of the equalizer tube and water reserve, and these several views also show how the numbers of spiral sections of the various coils can be varied, in addition to showing how the coils can be superposed in different positions relatively. In each form, however, the advantage of the equalizing tube is present, so that the lower coil is supplied with water from the water reserve even when the flow of water into the boiler is shut off. It will also be noted that the tubing of the water reserve and steam reserve coils are of relatively large diameter, to give these coils capacity while the tubing of the water heating, steam generating, steam drying out and steam super heating coils underneath the coil 5 than within the lower portion of the coil 1 is of smaller diameter and capacity.

Figure 13:
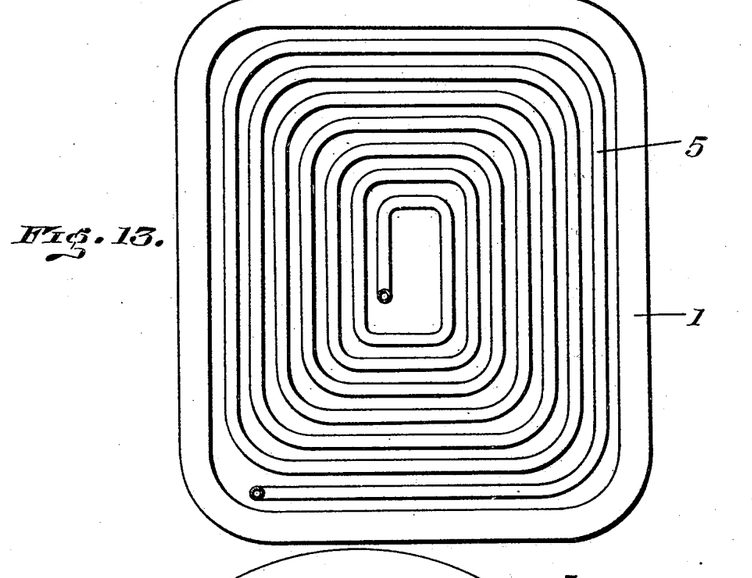
Figure 13 is a plan view showing how the coils can be made for square, oblong or oval boilers.

Although the coils above described and shown as being of circular or cylindrical formation, it will be readily appreciated, by reference to Figure 13, that the coils may be of different forms, for use in square, oblong, oval or differently shaped boilers. Other variations and changes can be made, as will suggest themselves to the skilled mechanic in adapting the improvements to various boilers and conditions, within the scope of the appended claims.

Having thus described the invention, what is claimed as new is:—

1. A boiler having generating coils, steam coils above said generating coils, a water reserve chamber forming a jacket surrounding said coils, the lower portions of said generating coils and chamber being in communication for the flow of water from one to the other, means for delivering water to said generating coils and chamber, an equalizing tube in communication with said generating coils and leading upwardly therefrom, said steam coils, tube and upper portion of said chamber being in communication for the flow of steam from one to the others.

2. A boiler having generating coils, steam coils above said generating coils and separate therefrom, a helical water reserve coil surrounding said coils and forming a jacket therefor, the lower portions of said generating coils and reserve coil being in communication for the flow of water from one to the other, means for supplying water to said generating coils and reserve coil, and an equalizing tube in communication with the generating coils and leading upwardly therefrom, said steam coils, tube and upper portion of the reserve coil being in communication for the flow of steam from one to the others.

3. A boiler having a coiled water reserve chamber forming a surrounding jacket, water heating and steam generating coils within the lower portion of the water reserve chamber and connected to the lower end thereof to receive water therefrom, means for delivering water to said coils and chamber, steam coils within the water reserve chamber above the water heating and steam generating coils, and connected to the upper portion of the water reserve chamber, and an equalizing tube connecting the water heating and steam heating generating coils with the water reserve chamber to equalize the pressure aganst the water in the water reserve chamber and to deliver steam to the upper portion of the water reserve chamber.

4. A boiler having a water reserve coil forming a surrounding jacket, water heating and steam generating coils within the lower portion thereof, the lower portions of said coils being connected for the flow of water from one to the other, means for delivering water to said coils, steam coils within the water reserve coil above the water heating and steam generating coils, the upper ends of the water reserve and steam coils being connected, and an equalizing tube connecting the water heating and steam generating coils with the water reserve coil.

5. A boiler having generating coils, steam coils above and separate from said generating coils, a central vertical equalizing tube within said coils around which said coils are disposed, a vertical water reserve chamber, the upper portion of said chamber above said generating coils being adapted to hold steam and surrounding the steam coils, the lower portions of said generating coils and reserve chamber being in communication for the flow of water from one to the other, means for delivering water to said generating coils and chamber, said tube having its lower portion in communication with the generating coils, said tube leading upwardly from said generating coils, and said steam coils and tube being in communication with the upper portion of said chamber.

6. A boiler having a surrounding water reserve chamber, a central stand pipe within said chamber, generating coils surrounded by the lower portion of said chamber surrounding said stand pipe, steam coils above and separate from said generating coils and surrounded by the chamber and disposed around said stand pipe, the upper end of said stand pipe and steam coils being in communication with the upper portion of said chamber, the lower end of said stand pipe, chamber and generating coils being in communication for the flow of water from said chamber to said stand pipe and generating coils, and means for supplying water to said chamber.

7. A boiler having a central stand pipe, generating coils surrounding said stand pipe and connected thereto, a second stand pipe to which said coils are connected for the flow of water and steam through the coils from one stand pipe to the other, a steam chamber surrounding the central stand pipe above the generating coils, and a reserve coil the upper portion of which is adapted to hold steam and which surrounds said steam chamber, the lower end of said reserve chamber being in communication with said stand pipes for the return of water to the generating coils, and the upper portion of the central stand pipe, reserve chamber and the steam chamber being in communication for the flow of steam from one to the others.

8. A boiler having a central stand pipe, generating coils surrounding the lower portion thereof and connected thereto, a second stand pipe to which said coils are connected for the flow of water and steam through the coils from one stand pipe to the other, a steam coil surrounding the central stand pipe above the generating coils, and a water reserve coil surrounding said generating coils and steam coil and adapted to hold steam in the upper portion thereof above the generating coils, the lower end of said reserve coil being in communication with said stand pipes for the flow of water from said reserve coil to the generating coils, and the upper portion of said reserve coil, steam coil and central stand pipe being in communication for the flow of steam from one to the others.

9. A boiler comprising generating coils, a vertical water reserve chamber located at the exterior of said coils and connected thereto for the flow of water between said chamber and coils, steam coils above the generating coils and separate therefrom, and a tube communicating with the generating coils for conveying steam therefrom, said tube and steam coils being in communication with the upper portion of said chamber for the flow of steam from one to the other, and the upper portion of said reserve chamber above the generating coils being adapted to hold steam and surrounding the steam coils.

10. A boiler comprising a central stand pipe, a second stand pipe, generating coils surrounding the central stand pipe and connected at their opposite ends to the two stand pipes, a steam chamber surrounding the central stand pipe and being independent of said generating coils, said steam chamber and upper portion of the central stand pipe being in communication with the second stand pipe for the flow of steam between the central stand pipe and steam chamber and for the return of water to the second stand pipe.

In testimony whereof I have signed my name to this specification in the presence of two subscribing witnesses.

HARTLEY O. BAKER.

Witnesses:
  ISABELLE S. TOUR,
  SADIE E. LEVINE.